March 7, 1939.      J. W. CONKLIN      2,149,727
VOLUME CONTROL SYSTEM
Filed March 1, 1935      7 Sheets-Sheet 1

INVENTOR
J. W. CONKLIN
BY H. S. Grover
ATTORNEY

March 7, 1939.    J. W. CONKLIN    2,149,727
VOLUME CONTROL SYSTEM
Filed March 1, 1935    7 Sheets-Sheet 2
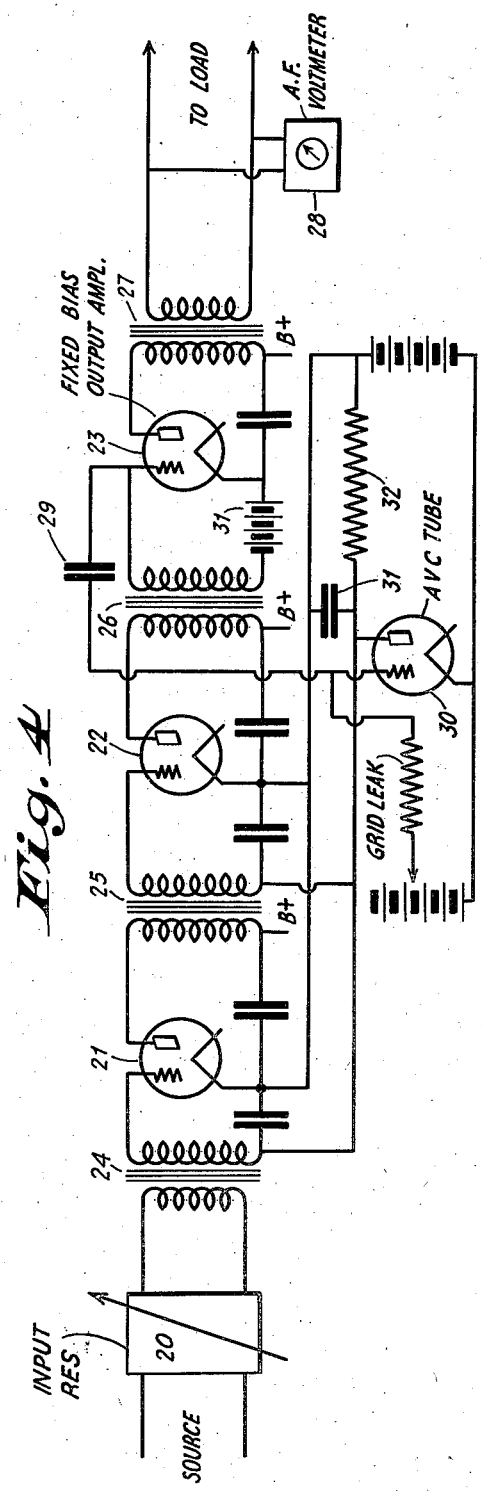
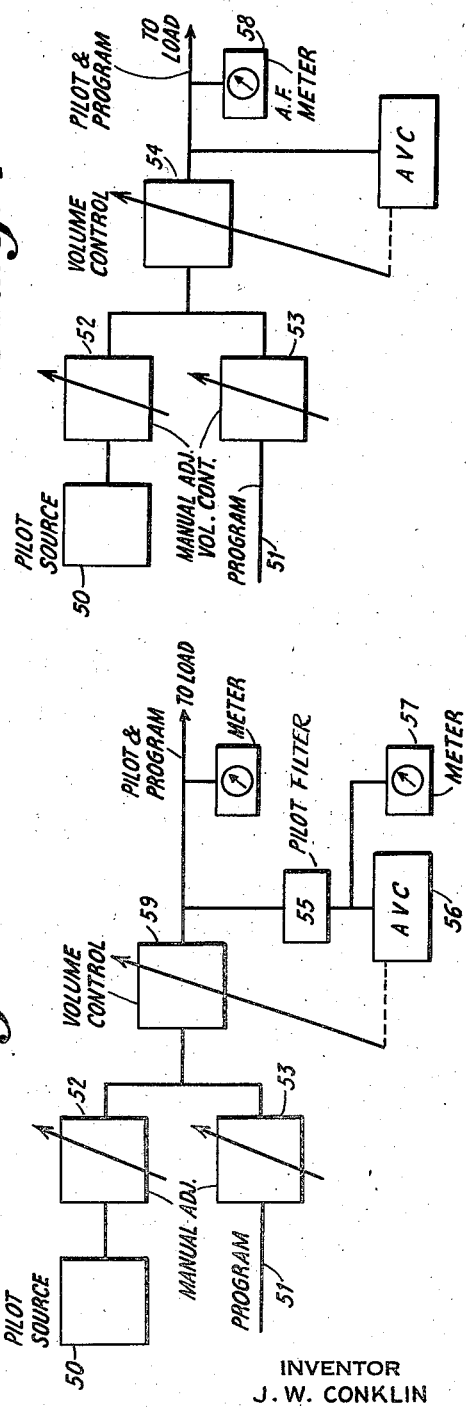
INVENTOR
J. W. CONKLIN
BY H S Grover
ATTORNEY March 7, 1939.  J. W. CONKLIN  2,149,727
VOLUME CONTROL SYSTEM
Filed March 1, 1935   7 Sheets-Sheet 3

INVENTOR
J. W. CONKLIN
BY
ATTORNEY

March 7, 1939.  J. W. CONKLIN  2,149,727
VOLUME CONTROL SYSTEM
Filed March 1, 1935   7 Sheets-Sheet 4

INVENTOR
J. W. CONKLIN
BY
ATTORNEY

March 7, 1939. J. W. CONKLIN 2,149,727
VOLUME CONTROL SYSTEM
Filed March 1, 1935 7 Sheets-Sheet 5
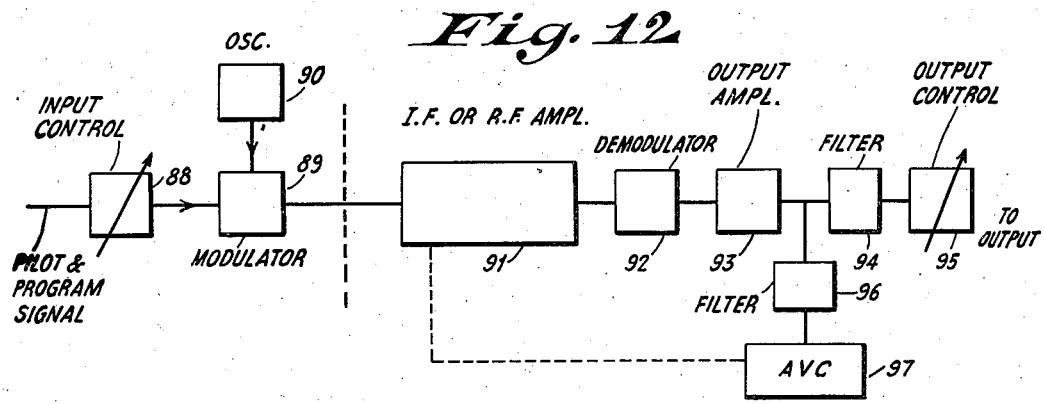
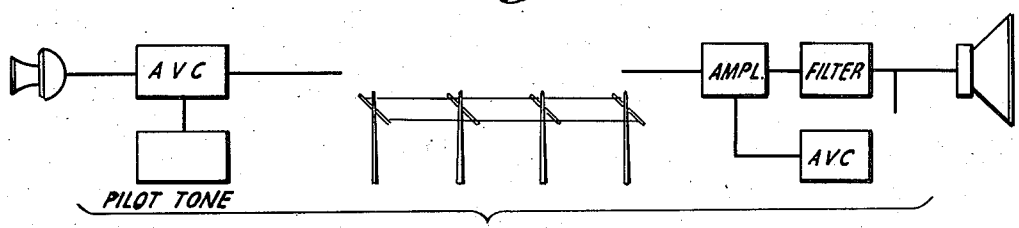
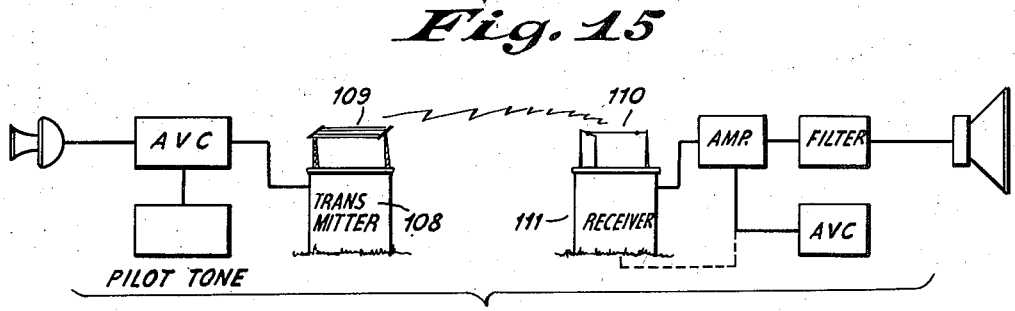
INVENTOR
J. W. CONKLIN
BY
ATTORNEY March 7, 1939.  J. W. CONKLIN  2,149,727
VOLUME CONTROL SYSTEM
Filed March 1, 1935   7 Sheets-Sheet 6

INVENTOR
J. W. CONKLIN
BY *H. S. Grover*
ATTORNEY

March 7, 1939.   J. W. CONKLIN   2,149,727
VOLUME CONTROL SYSTEM
Filed March 1, 1935   7 Sheets-Sheet 7
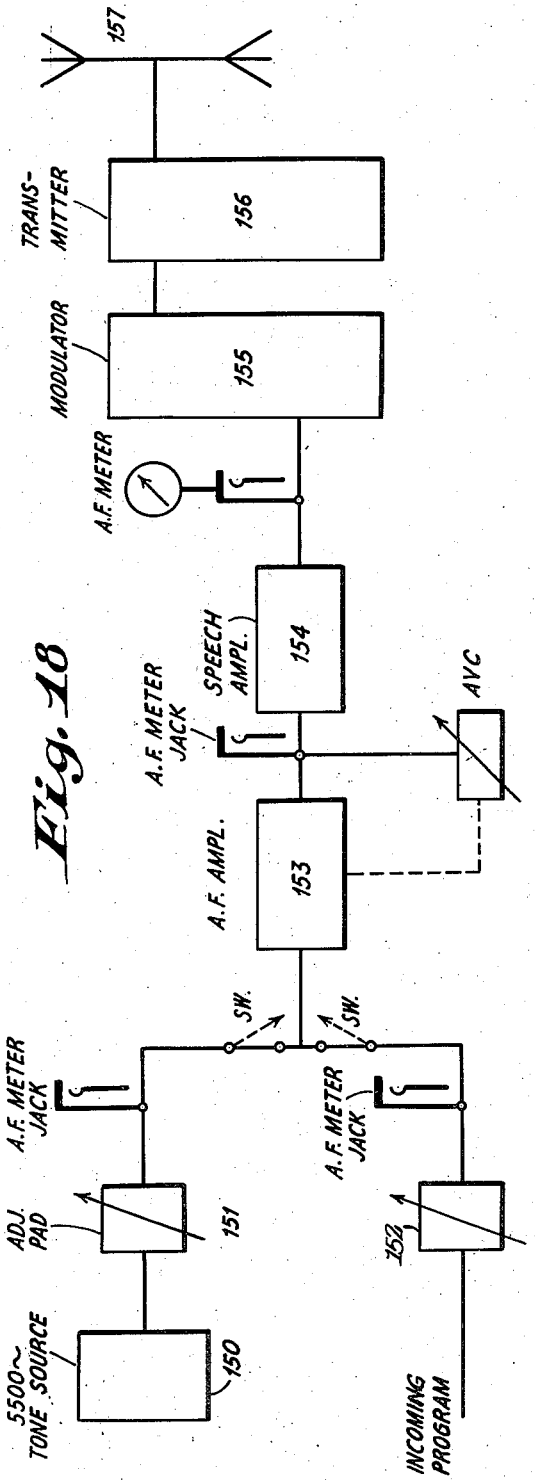
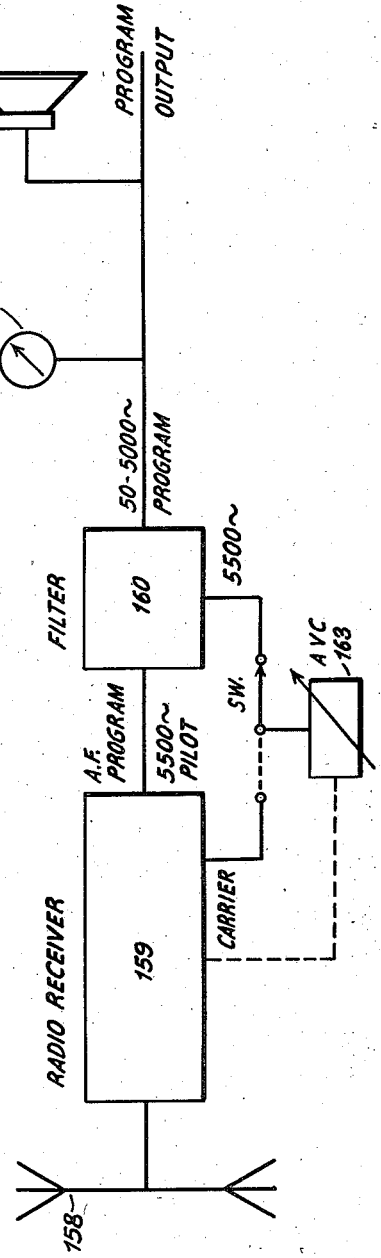
INVENTOR
J. W. CONKLIN
BY
ATTORNEY Patented Mar. 7, 1939

2,149,727

UNITED STATES PATENT OFFICE 2,149,727

VOLUME CONTROL SYSTEM

James W. Conklin, Rocky Point, N. Y., assignor to Radio Corporation of America, a corporation of Delaware Application March 1, 1935, Serial No. 8,805

2 Claims. (Cl. 178—44)

This invention relates to a system for maintaining substantially constant modulation levels in a signal transmission or recording system.

An object of this invention is to simplify and improve existing signal systems for transmission of intelligence.

Another object of this invention is a method of volume control in a signal transmission, translating or recording system, whereby variations in the intelligence components of the transmitted, translated or recorded signal are removed before transmitting, translating or recording the intelligence components being transmitted to the translating point or recorded at a substantially constant volume level. The transmitting or translating volume control device is also caused to vary an independent signal in accordance with the volume regulation applied, in such a manner that it may be selectively received or selectively translated and used to control the output volume at the receiver translator or reproducer to substantially restore the original variations in volume to the signal. This control signal may be transmitted, translated or recorded independently or as a part of the composite signal with the desired intelligence.

It is a further object of my invention to remove the two factors of background noise level and distortion occurring at the transmitter, by allowing all signal input levels to be transmitted or recorded at a substantially constant or optimum level, which will give a satisfactory noise ratio for all noise levels including the weakest, and a minimum of distortion by making it unnecessary to operate the system in the distortion regions during the strongest background noise levels.

It is a further object of my invention to provide means whereby a signal may be transmitted to a remote point at any desired volume level and the output or reproduced volume at the remote point controlled automatically or manually by an operator at the transmitting point.

It is still another object of my invention to provide means for automatically silencing the output of the receiving or translating system during periods when no signal is being transmitted, thereby completely eliminating background noise during silent periods.

In the prior art practice, it has been customary to transmit, translate, or record variations in the input signal as direct variations in the intelligence components of the transmitted signal and reproducing them correspondingly. Intelligence, in the nature of musical programs, is subject to extreme variations in volume level. For example, some types of orchestral music are subject to extreme variations in volume level variations, such variations frequently being over 70 decibels. Experience has indicated that the background noise level should be over 30 decibels below any given signal level in order not to be objectionable. These two factors place requirements on a transmitting, translating, or recording system making it necessary to reproduce levels differing by 70 decibels with constant fidelity and background noise level over 100 decibels below the peak capabilities of the system. Such requirements are generally impossible to meet, particularly over a radio circuit because of the fact that in order to meet these requirements, it would be necessary to reproduce levels differing by 70 decibels with constant fidelity and background noise level over 100 decibels below the peak capabilities of the system. On the present-day radio broadcast circuit, a compromise is effected by compressing the musical programs in such a manner that the weakest part will not fall below the noise level at the receiver, which means limiting the variations in volume to the order of 30 to 40 decibels with the weakest parts generally falling in the background noise level and the heaviest parts causing distortion through high modulation. Even if the volume level of the weakest part is strong enough to satisfactorily ride over the noise background, the noise level will still be decidedly evident during periods when no signal is being transmitted. The effect of the noise is the same, whether it be caused by imperfections in the actual equipment, or a phenomena of the transmission, translating or recording media, making it necessary to take extreme and expensive precautions to reduce the noise background level in the equipment which would otherwise be satisfactory, such as, for example, the alternating current hum background. This latter-mentioned background is generally unobjectionable and not noticed during periods of high modulation, but would appear only as an objectionable background at special intervals, such as idle periods and periods of low modulation. Because of the fact that alternating current is extensively used for the heating of the filaments of present-day transmitters, there cannot be expected to be an improvement with respect to the hum or background noise, without radical and expensive alterations to the existing transmitters. In practically all systems of transmission, translating, and recording for reproducing intelligence, the same two factors of background noise levels and distortion, when the transmitter is operating near the maximum capacity of the system are the restricting factors in determining variations in signal volume which may be successfully used.

This invention is not to be confused with existing systems of automatic volume control for application to the radio receiver which compensate for variations in the transmission characteristics caused by atmospheric conditions.

This invention has its principal application in the transmission of speech and musical programs having variable volume levels in which it is desirable to reproduce faithfully, but will be equally applicable to other types of variable volume level intelligence which it would be advantageous to transmit at constant level to obtain the benefits previously referred to.

The underlying principle of my invention is applicable to practically all systems of transmitting, translating or recording intelligence, where music, speech, or other intelligence material, is transmitted in some form which may be directly reconverted into music at the receiving point, as distinguished from systems using telegraph codes for the purpose of conveying intelligence.

This invention comprises, briefly, a signaling, translating or recording system for the transmission or recording of intelligence, having means for regulating the volume input to the signal in such a manner as to transmit, translate or record intelligence at a substantially constant or optimum level. The system is further provided with means for conjunctively regulating or controlling an auxiliary or pilot signal to be transmitted, translated or recorded separately, or as a part of the intelligence signal in such a manner as to register the changes in volume effected on the intelligence signal. A receiving, translating or reproducing system is provided with means selectively responsive to the above-mentioned auxiliary signal in such a manner as to regulate the output of the receiving, translating or recording system to substantially restore the original variations in the volume level.

The invention will best be understood by referring to the accompanying drawings, in which Fig. 1 illustrates a system for automatically maintaining constant volume in an audio-frequency system by electromagnetic means;

Fig. 4 is a system for automatically maintaining constant volume in an amplifier system of the audio-frequency type having grid-controlled amplifiers;

Fig. 6 is a system of this invention for controlling an auxiliary or pilot signal in accordance with volume regulation on the main signal;

Fig. 7 is another modification of Fig. 6;

Fig. 12 is a system for volume control by means of a composite signal;

Fig. 13 is a diagram of a constant level signaling and recording system, as applied to wire-line telephony;

Fig. 14 is a system similar to that of Fig. 13, except it is applied to carrier-current telephony;

Fig. 15 is a constant level signaling and recording system applied to radio telephony;

Fig. 18 is a diagram of a constant level system, as applied to a radio telephone broadcast transmitter;

Fig. 19 is a diagram of a constant level system, as applied to a radio telephone broadcast receiver.

Figure 1:
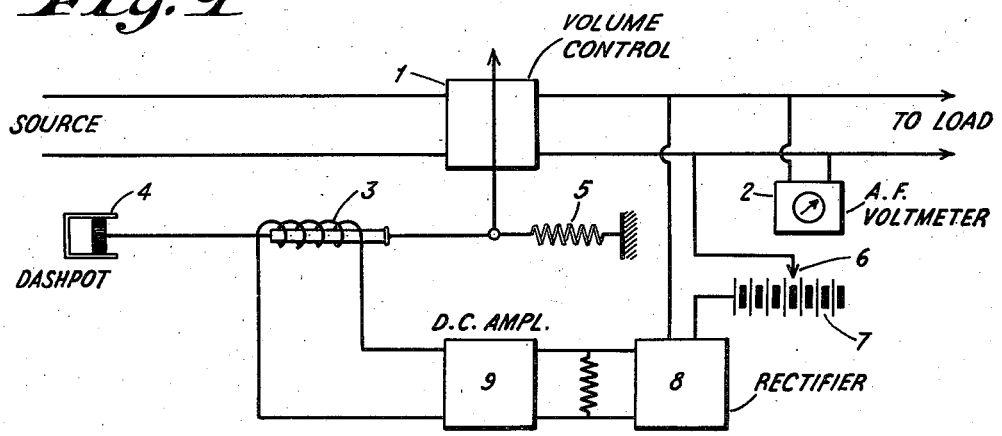

Referring now in detail to Fig. 1, there is shown a system for controlling the volume of an audio-frequency signal in a manner to obtain substantially constant level, wherein the volume level is changed by an attenuator 1 which is automatically adjusted by means of a solenoid 3 working in conjunction with a dash-pot 4 and a spring 5. The attenuator 1 is arranged to return to the portion of maximum sensitivity in the absence of signal by the action of spring 5, an audio-frequency volume meter 2 being provided merely for the purpose of reference and when too great a swing is observed in the meter, the volume may then be adjusted by operating the manual adjuster 6 at the D. C. source 7. The system is also provided with a rectifier 8 or a vacuum tube biased to draw current only when the desired peaks are exceeded. From the rectifier, the solenoid circuit is connected to a D. C. amplifier 9, preferably of the "Thyratron" type.

Figure 2:
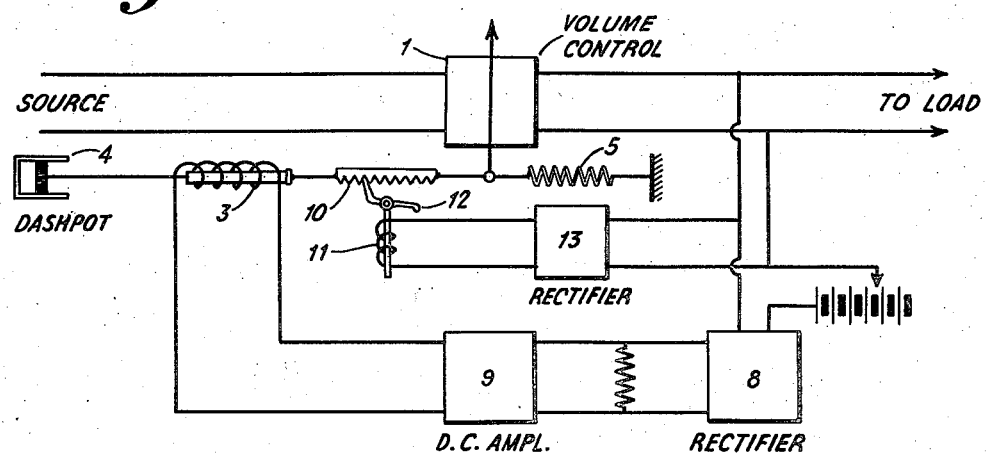
Fig. 2 illustrates a system for automatically maintaining constant volume level in an audio-frequency system, by means of a ratchet and an electromagnet.

Fig. 2 illustrates another modification, wherein the volume-controlled attenuator is arranged to lock in the absence of a signal, the attenuator arm being associated with a ratchet 10, the ratchet being operated by a second solenoid 11 and pawl 12. The remaining portion of this system is otherwise similar to Fig. 1, mentioned above, except there is provided a small rectifier 13 which may be in the form of a vacuum tube biased to draw current only during the period of minimum signal, by means of which the current flows in the solenoid 11 and releases the ratchet with a minimum signal. During the period of minimum signal the ratchet 10 and pawl 12 is not in use.

Figure 3:
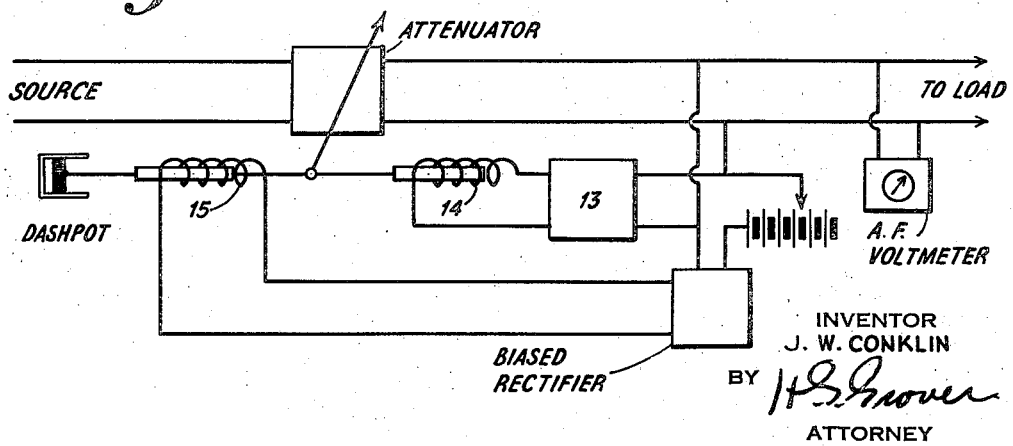
Fig. 3 illustrates a system for automatically maintaining constant volume level in an audio-frequency system by means of a strong and weak solenoid associated with a suitable dash-pot.

Fig. 3 is a modification of Fig. 2, except that the automatic control mechanism attached to the attenuator is arranged to be inoperative in the absence of a signal. This is provided by arranging two solenoids adjacent each other. The strong signal solenoid 15 is shown arranged on the same line or common shaft with a weak signal solenoid 14, the energy of the weak signal solenoid being obtained from the minimum signal rectifier relay 13. Both of the above-mentioned solenoids may be replaced, if desired, by a small motor having opposing fields connected to the rectifiers and a gear drive arranged on the attenuator.

Fig. 4 illustrates an automatic vacuum tube amplifier of the audio-frequency type having grid-controlled amplifier tubes. This figure is shown diagrammatically as having an input pad 20 to reduce the signals to a low level. The balance of the amplifier circuit is shown as containing the usual arrangement of tubes 21, 22, 23, having transformers 24, 25, 26, and 27. An audio-frequency voltmeter 28 is provided to indicate the volume level in the load circuit. A condenser 29 is provided for automatic volume control coupling, or it may be arranged on an auxiliary secondary. Automatic volume control is obtained by the use of tube 30. The circuit may also be provided with a time-delay condenser 31 and resistance 32.

Figure 5:
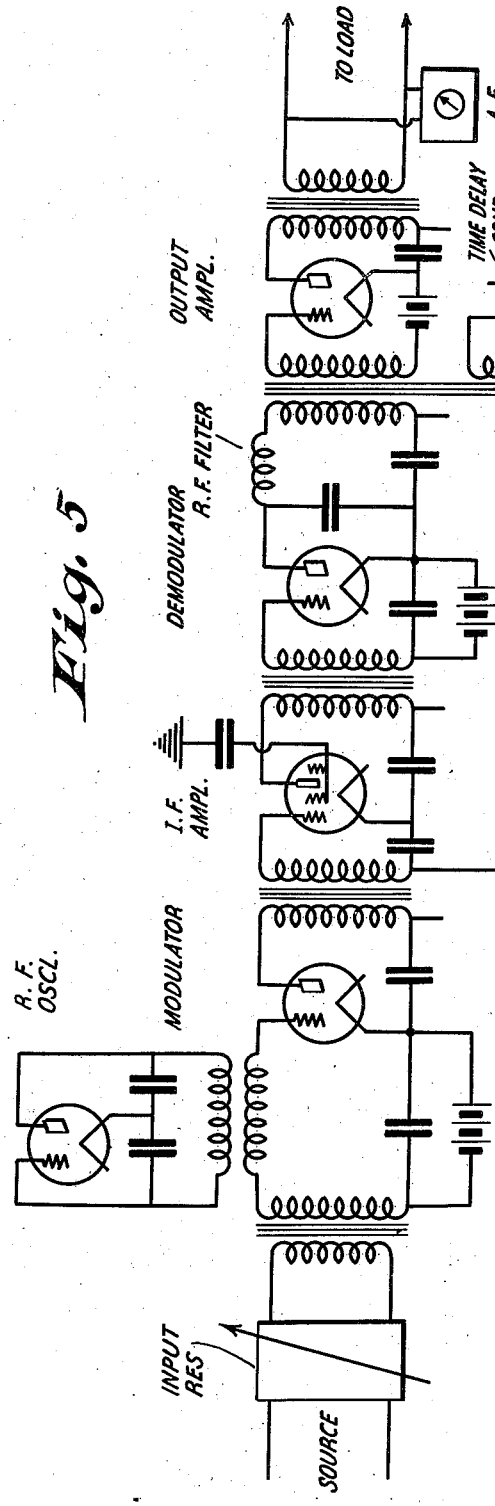
Fig. 5 is a system for automatically maintaining constant volume in an amplifier system of the intermediate-frequency type, having a bias-controlled intermediate-frequency amplifier.

Fig. 5 shows another modification for automatically maintaining constant volume in an amplifier system of the intermediate-frequency type, having a grid bias-controlled intermediate-frequency amplifier tube, the automatic volume control tube 30 being actuated by the audio-frequency output and control gain of an intermediate-frequency amplifier.

Any of the foregoing volume control systems may be operated to control an auxiliary or pilot signal of this invention in accordance with the regulation applied to the main signal and may be divided into three groups: First, as in Figure 6, a system for controlling the auxiliary signal in accordance with the volume regulation on the main signal, wherein the pilot signal is of the same nature as the main signal, for example, where a pilot tone is being used on a musical program. This circuit comprises a pilot source 50 and a program circuit 51, both of which are connected to manual adjustments 52 and 53. The controlled amplifier or automatic volume control attenuator is indicated at 54; 55 is a pilot filter; 56 is an automatic volume control with manual adjustment; 57 is a meter which is provided to observe the deflection in the pilot circuit; 58 is a meter in the combined pilot and low program circuit to observe the variation in volume.

Second, a variation of the above system which eliminates a pilot filter and uses for a pilot a small percentage, say, 10 to 20% of the peak program input. The output will then be controlled by the stronger of the two signals, and at the same time the combined output will be held at a constant peak level. This system does not hold the main signal at constant level, except when it exceeds the pilot signal level; but considerably simplifies the system and reduces the range of volume control action, thus enabling the transmitting or recording system to be operated at maximum capabilities at all times.

The second system is illustrated in Fig. 7, wherein the pilot source 50 is combined with the program 51 by the manual adjustments 52 and 53 to the controlled amplifier or volume control 54, the combined pilot and program circuit being connected to the automatic volume control 56. An audio-frequency meter 58 is provided to observe the volume fluctuations.

Third, a further modification is where the pilot signal is of a different nature from the program signal. For instance, where the pilot is carried over a separate channel, a direct-current pilot on a wire line or a variable-frequency pilot, etc. It will be necessary, when employing this circuit, to have a separate control on the pilot actuated by the main signal regulator, except in the case where the electromagnetic control is used to actuate a resistor type volume control which may be designed to regulate a direct-current pilot signal in the same manner in which it regulates the audio currents.

Figure 8:
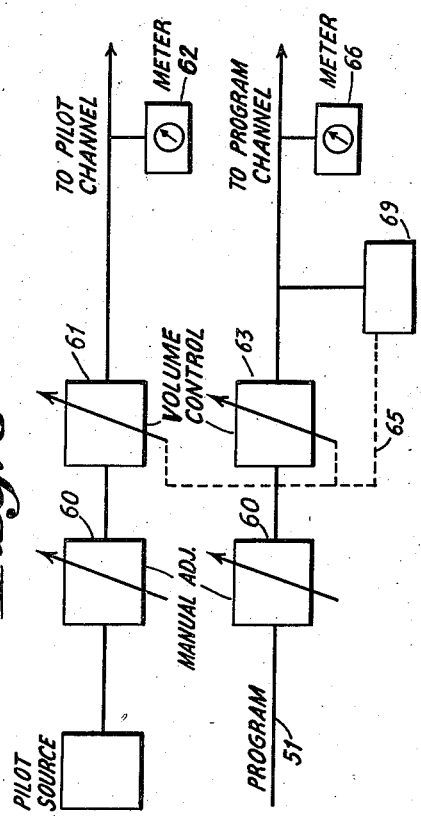
Fig. 8 is still another modification of the system shown in Fig. 6.

Fig. 8 illustrates the third system for auxiliary control of both the pilot source and the program circuit separately, for example, where the pilot signal is provided by the pilot source having connected thereto a manual adjustment 60. A pilot control 61 may be in the form of a volume control, frequency control, light valve rheostat, etc., depending upon the requirements of the system. A meter 62 is provided for observing the variation in volume level.

The program circuit comprises manual adjustment similar to 60, a controlled amplifier or volume control 63 and automatic volume control 69 with a manual adjustment. The automatic volume control 69, the controlled amplifier 63 and the pilot control 61 may be manually linked together so as to be operated simultaneously by a linkage system 65. A meter 66 is provided to observe the fluctuations in the program circuit.

Figure 9:
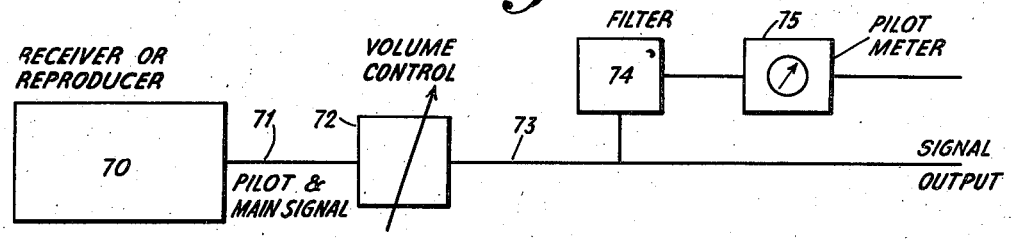
Fig. 9 is a system for manually controlling the volume by means of a pilot signal and meter.

Fig. 9 is a system for manual control of the volume, by means of a pilot signal. This circuit comprises a receiver or reproducer terminal equipment 70 connected to supply a pilot and signal by means of lead 71 to a volume control 72 which is manually operated. A connection 73 connects a filter 74 which is selective only to the pilot signal; a meter 75 is provided to observe the volume in the pilot circuit.

Figure 10:
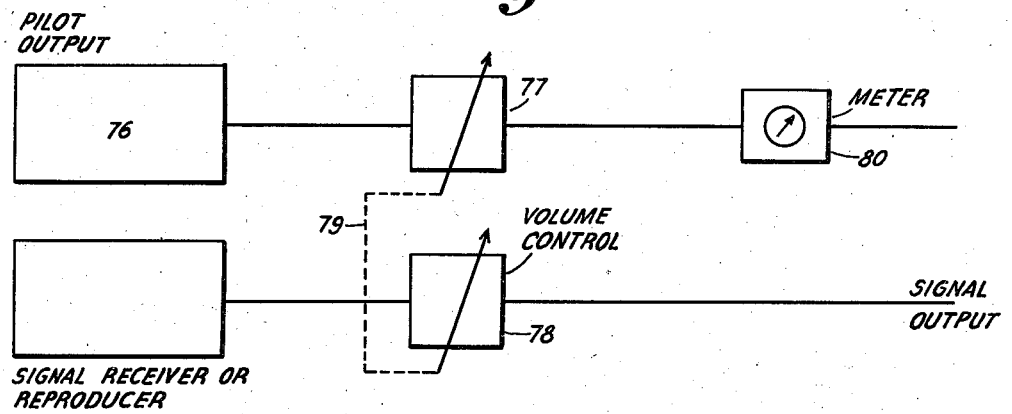
Fig. 10 is another modification of Fig. 9.

Fig. 10 illustrates a circuit similar to that of Fig. 9, except in this modification the pilot output 76 is separately connected to a pilot meter sensitivity control unit 77, which is linked to a volume control 78 connected in the signal output circuit by a link 79 for simultaneously changing the volume in both the signal circuit and the pilot circuit. An operator adjusts the volume control in the signal circuit to hold the pilot meter 80 readings constant. A variation of this modification may be employed whereby the pilot fluctuations appear directly on the meter and are not controlled, the local operator adjusting the signal volume control to correspond to the pilot meter readings.

A further modification of this circuit may be that of the electromagnetic type which is a further improvement of the manual type, wherein the meter 80 is replaced by electromagnetic equipment which controls the signal volume control and operates by holding the pilot signal level constant, or in accordance with the pilot signal variations. As these systems are obvious electromagnetic combinations of those shown in Figs. 1 and 9, specific diagrams are believed to be unnecessary to illustrate this modification.

Figure 11:
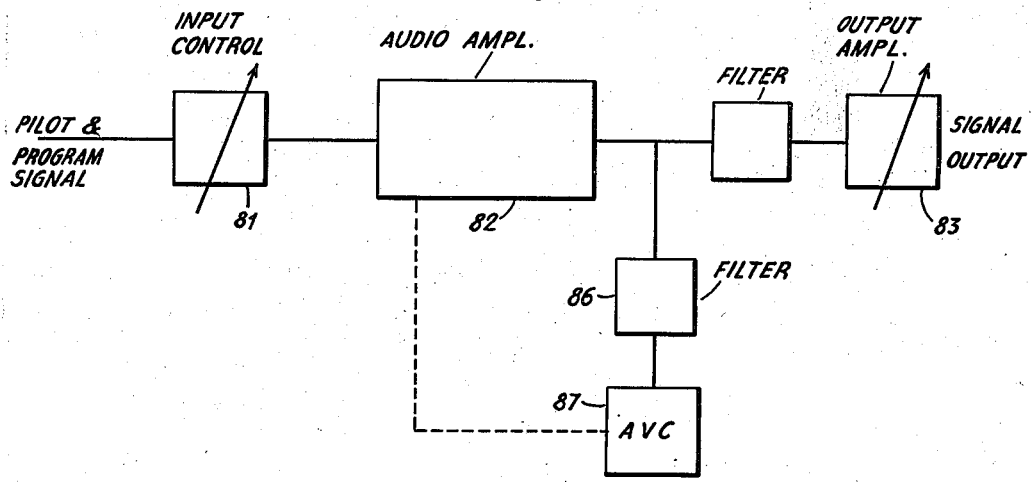
Fig. 11 is still another modification of Fig. 9.

Fig. 11 illustrates a diagram wherein volume control is obtained by means of a pilot signal having an automatic control of the vacuum tube type, and comprises an input pad 81, a bias controlled audio amplifier 82, the output of which is arranged to feed the program to the input of an output amplifier and gain control 83. There is connected through a program rejector filter 86, an automatic volume control 87 operated by the pilot signal. The detailed circuit arrangement of this system is in general similar to that of Fig. 4.

Fig. 12 illustrates a system wherein the volume is controlled by means of a signal which is a composite circuit of the pilot and program signal, and comprises an input control 88 which is connected to a modulator 89 having associated therewith a separate oscillator 90. Connected to the modulator is a bias controlled intermediate-frequency or radio-frequency amplifier 91 connected to a demodulator 92, an output amplifier 93, a pilot rejector 94, an output control 95. At the junction of the output and pilot rejector filter there is connected a program rejector filter 96 and an automatic volume control 97 which is actuated by the pilot signal and which varies the gain of the amplifier 91.

This figure can be divided between the modulator and the bias-controlled intermediate-frequency amplifier as shown by the dotted line, the section appearing to the left being equivalent to a radio telephone transmitter circuit arrangement and the section to the right being equivalent to a radio receiver with automatic volume control, with the exception that the automatic volume control is actuated by a filtered pilot signal.

Automatic volume control may be also obtained by a separate signaling system, wherein the pilot signal is transmitted over a different channel or as a signal of different nature from that of the program signal. In this case, the automatic volume control becomes a device responsive to the changes in the pilot signal and correspondingly controlling the volume of the signal, such as, for example, by means of the bias-controlled amplifiers as shown in Figs. 11 and 12. This method of volume control would be entirely independent of any other automatic volume control in the system, such as might be used to compensate for fading.

In the foregoing I have shown and described means for recording audio-frequency volume variations to a substantially constant or optimum level, and coincidentally controlling a pilot signal. The following figures illustrate how the two are employed conjunctively on various signaling or translating systems to obtain the advantage of constant transmission or translation.

Fig. 13 illustrates a system of constant level signaling and recording, such as is applied to line telephony, wherein the transmitter 100 is connected to an automatic volume control 101 having associated therewith a pilot signaling arrangement 102, the automatic volume control being connected to an ordinary telephone line 103. At the opposite end of the telephone line there is connected an amplifier 104, a filter 105, pilot circuit being arranged with an automatic volume control 106. The output of the filter is then connected to a receiver 107 or other suitable responsive device.

Fig. 14 is a circuit arrangement similar to that of Fig. 13, except it applies to carrier-current telephony.

Fig. 15 is similar to Figs. 13 and 14, except the telephone line is replaced by a transmitter 108 having an antenna 109 and a receiving antenna 110 and a receiver 111. The pilot tone for the systems described in Figs. 13, 14 and 15 can be of five different types, first, a type having constant frequency and a variable amplitude tone; second, a constant amplitude variation and a frequency tone; third, the pilot may be transmitted over another circuit; fourth, the pilot tone may be that of a variable carrier-frequency, and fifth, the pilot tone may be transmitted by a different form of modulation.

Figure 16:
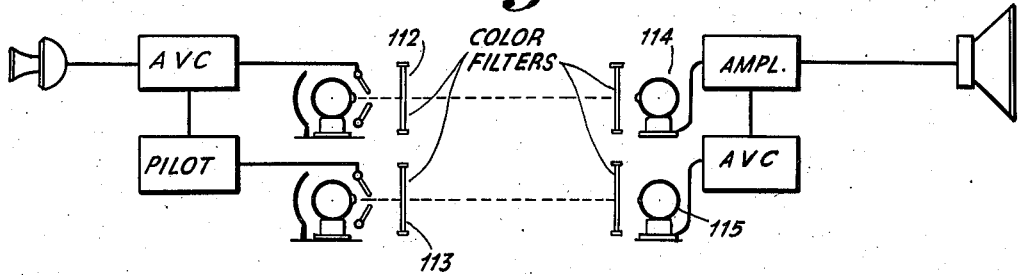
Fig. 16 is a constant level signaling and recording system applied to light beam telephony.

Figure 16 contains apparatus in common to that mentioned in Figures 13 to 15, inclusive, except that each signal is transmitted over a light beam instead of by wires or radio. Each signal is arranged to operate a separate reflector, variable shutter or variable light source thus transmitting a variable intensity beam of light through filters 112, 113 and thence to separate receiving photocells 114, 115. While in this figure the pilot signal is shown as transmitted as a separate beam of colored light it may be combined as an extra tone on the signal beam, as described in some detail heretofore.

Figure 17:
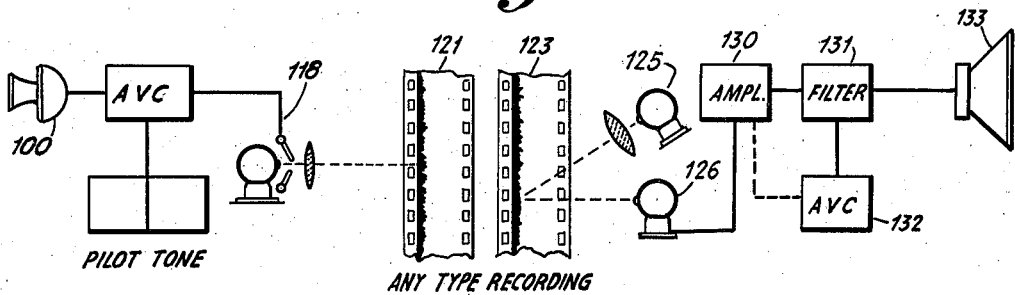
Fig. 17 is a constant level signaling and recording system applied to sound-film recording.
Figure 17A:
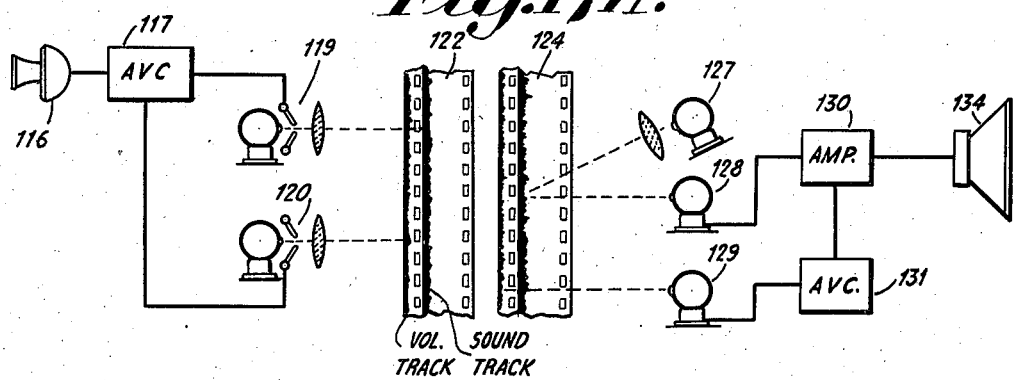
Figure 17a is a modification of the system shown in Figure 17.

Figure 17 is a diagram showing the application of my development to sound film recording. The desired signal is picked up by microphone 100 and mixed with a pilot tone as described heretofore and thence applied to a source of modulated light 118. This light is then used to record as a combined sound track on film 121 the intelligence signal and pilot tone. When it is desired to reproduce the signal a beam of light from source 125 is acted upon by the sound track and variably affects photocell 126. The resultant electric energy is applied to amplifier 130, the pilot tone is filtered out by filter 131 and applied to the automatic volume control 132 which controls the gain of amplifier 130. The resultant signal is then applied to loudspeaker 133. A further modification shown in Figure 17a involves the separate recording of the pilot tone and the intelligence signals. When reproducing these signals the light from source 127 as affected by the two sound tracks is applied to photocells 128 and 129. Photocell 128 is used to pick up the intelligence signal while 129 picks up the pilot tone. As before, the automatic volume control 131 varies the gain of amplifier 130 and the resultant modified signal is applied to loudspeaker 134.

Fig. 18 is a constant volume level radio telephone transmitter, which is particularly adapted to a broadcast relay circuit. This circuit is provided with a tone source 150 of approximately 5500 cycles which is connected to an adjustable resistance pad 151. The incoming program circuit is connected to a separate adjustable pad 152 which is connected to a bias-controlled audio-frequency amplifier 153, a speech amplifier 154, a modulator 155 and a transmitter 156, which then connects to the antenna system 157.

Fig. 19 shows a diagram of a constant level system, as applied to a radio telephone broadcast receiver, comprising an antenna 158, a bias-controlled receiver 159, a combination filter 160 and a loudspeaker unit 161. An audio-frequency meter 162 is provided to observe the fluctuation in the volume level. There is connected to the receiver 159 an automatic volume control 163; a carrier circuit of approximately 5500 cycles is also connected to the automatic volume control and the combination filter 160. The automatic volume control 163 is arranged to hold the 5500 cycles tone constant, restoring the original volume variations and compensating for atmospheric fading.

It is to be understood that, although my invention comprises in all cases a transmitting or recording system and a receiving system or reproducing system, it specifically embodies (1) a group of systems whereby the volume before transmission was reduced to substantially constant level and these reductions in volume are registered as variations in a pilot or auxiliary signal, and (2) a group of systems whereby the volume output of a reproducing or receiving system could be controlled by means of a pilot or auxiliary signal which had been transmitted or recorded as a part of or separately from the intelligence components, and (3) I have combined these various systems to form a transmitting or recording and receiving or reproducing system in which the transmission or recording was reduced to substantially constant volume and reproduced under control of the pilot signal with the original volume variations restored.

Other various methods are the use of constant frequency variable amplitude tone, constant amplitude variable frequency tone, transmission of the pilot signal over another radio circuit using variable carrier-frequency as a means of transmitting the pilot signal, and transmitting as a different form of modulation, such frequency or phase-modulation as opposed to amplitude modulation.

Having thus described my invention, what I claim is:

1. A translating system for the transmission of intelligence signals comprising an input and output circuit, a source of intelligence signals connected to said input, a volume control device connected to said input, automatic means for actuating said control device whereby energy is supplied to said output at an amplitude determined by the amplitude of said signals, said means comprising a pair of solenoids adjacent each other, armatures for said solenoids connected in opposing relationship to a common control shaft of said volume control, means to energize one of said solenoids comprising a rectifier connected to said output and having an output directly proportional in amplitude to the amplitude of the signal and means to energize the other of said solenoids comprising a second rectifier also connected to said output and having a maximum output in the absence of signals.

2. A translating system for the transmission of intelligence signals comprising an input and output circuit, a source of intelligence signals connected to said input, a volume control device connected to said input, automatic means for actuating said control device whereby energy is supplied to said output at an amplitude determined by the amplitude of said signals, said means comprising a pair of solenoids adjacent each other, armatures for said solenoids connected in opposing relationship to a common control shaft of said volume control, means to energize one of said solenoids comprising a rectifier connected to said output and having an output directly proportional in amplitude to the amplitude of the signal, and means to energize the other of said solenoids comprising a second rectifier also connected to said output and having a maximum output in the absence of signals, and a dash pot connected to said armatures for damping the movements thereof.

J. W. CONKLIN.